United States Patent [19]

Nakatani

[11] Patent Number: 4,550,343
[45] Date of Patent: Oct. 29, 1985

[54] VIDEO CAMERA APPARATUS
[75] Inventor: Nobuyuki Nakatani, Tokyo, Japan
[73] Assignee: Olympus Optical Co., Ltd., Tokyo, Japan
[21] Appl. No.: 621,047
[22] Filed: Jun. 15, 1984
[30] Foreign Application Priority Data Jul. 15, 1983 [JP] Japan ............... 58-109877[U]

[51] Int. Cl.$^4$ .............................. H04N 5/26
[52] U.S. Cl. .................... 358/229; 358/224; 358/209; 358/906; 381/26; 381/122
[58] Field of Search ............... 358/209, 224, 229, 227, 358/335, 906, 294; 381/122, 123, 91, 26

[56] References Cited

U.S. PATENT DOCUMENTS

| | | | |
|---|---|---|---|
| 3,845,238 | 10/1974 | Schneider et al. | 358/209 |
| 4,070,547 | 1/1978 | Dellar | 381/26 |
| 4,239,356 | 12/1980 | Freudenschuss et al. | 354/23 R |
| 4,388,494 | 6/1983 | Schöne et al. | 381/26 |
| 4,389,675 | 7/1983 | Suzuki et al. | 358/229 |
| 4,409,619 | 10/1983 | Takubo et al. | 358/224 |
| 4,450,487 | 5/1984 | Koide | 358/335 |
| 4,458,270 | 7/1984 | Kuno et al. | 358/225 |
| 4,472,742 | 9/1984 | Hasegawa et al. | 358/227 |
| 4,489,442 | 12/1984 | Anderson et al. | 381/81 |

FOREIGN PATENT DOCUMENTS 55-109080  8/1980  Japan.

Primary Examiner—Gene Z. Rubinson
Assistant Examiner—Robert Lev
Attorney, Agent, or Firm—Frishauf, Holtz, Goodman & Woodward

[57] ABSTRACT

A video camera apparatus of the present invention has a special switch circuit which, when an electronic view finder with a stereo microphone is mounted on a video camera main body in a reverse posture, electrically reverses the top/bottom portions of picture information of a video signal supplied to the electronic view finder and also exchanges the L and R information of stereophonic signals supplied to a stereo recording apparatus. The signal selection of stereophonic signals from the stereo microphone and that of top/bottom-reversed and top/bottom-nonreversed video signals from a video camera main body are respectively changed in accordance with the mounting posture of the electronic view finder. Therefore, a proper stereophonic recording can be effected both in the normal and reverse posture photographing.

21 Claims, 13 Drawing Figures

VIDEO CAMERA APPARATUS

BACKGROUND OF THE INVENTION

This invention relates to a video camera apparatus in which an electronic view finder being provided with a stereo microphone is detachably mounted on a video camera main body and particularly relates to improvement in signal selection of stereophonic signals from the stereo microphone.

Figure 1:
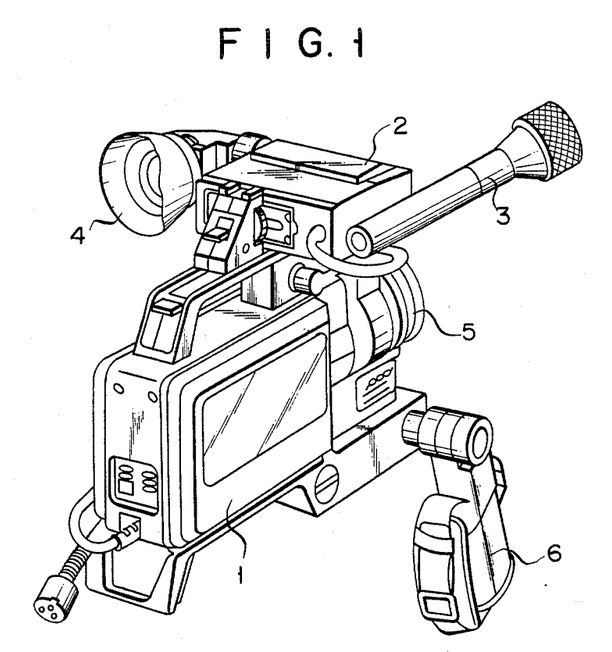
FIG. 1 is a perspective view of a conventional video camera.

FIG. 1 shows an outline of a conventional video camera. In FIG. 1, the numeral 1 denotes a video camera main body. An electronic view finder 2 is mounted on main body 1. View finder 2 is detachable from main body 1. A one-point stereo microphone 3 is fixed at one side of view finder 2, and a CRT 4 of the view finder is fixed at the other side thereof. Main body 1 is provided at the front center with a camera lens 5 and at the front lower end with a grip 6.

Figure 2A:
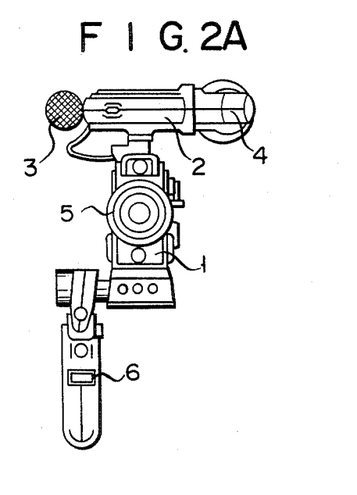
FIG. 2A illustrates a front view of the video camera shown in FIG. 1, wherein the electronic view finder 2 is mounted on the video camera main body 1 in a normal posture (for right eye photographing)
Figure 2B:
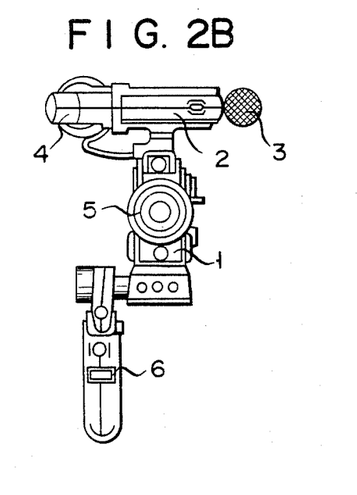
FIG. 2B illustrates a front view of the video camera shown in FIG. 1, wherein the electronic view finder 2 is mounted on the video camera main body 1 in a reverse posture (for left eye photographing)

Electronic view finder 2 may be mounted on video camera main body 1 as shown in FIG. 2A (right or normal posture) when the operator uses his or her right eye for photographing. Or, electronic view finder 2 may be mounted on video camera main body 1 as shown in FIG. 2B (left or reverse posture) when the operator uses his or her left eye for photographing. The upper side of a display screen in CRT 4 in the case of FIG. 2A (for right eye) becomes the lower side in CRT 4 in the case of FIG. 2B (for left eye). Thus, an image displayed at CRT 4 of FIG. 2B is top/bottom-reversed from an image displayed at CRT 4 of FIG. 2A. To avoid such inconvenience, the picture information of a video signal is electrically top/bottom-reversed by a video reverse switch (not shown) so that a normal image is obtained also in the case of FIG. 2B.

When electronic view finder 2 is mounted on video camera main body 1 in the left or reverse posture (FIG. 2B), the stereophonic information of signals from stereo microphone 3 is reversed (i.e., L & R to R & L) from the case of the right or normal posture (FIG. 2A). Such a situation provides no practical problem when an exact stereophonic sound effect is not required. However, in certain cases, the abovementioned reverse of stereophonic information provides an actual problem. For instance, when the operator photographs in the reverse posture (FIG. 2B) a train which runs from left to right, if the reversed stereophonic recording is performed, the playback of reproduced sound invites the audience to strange feelings. This is because the picture of the train runs from left to right but the sound image (e.g., alarm-whistle) of the train moves from right to left.

SUMMARY OF THE INVENTION

It is accordingly the object of the present invention to provide a video camera apparatus which ensures a correct stereophonic recording in both cases of a normal posture mounting and reverse posture mounting of the electronic view finder.

To achieve the above object, a video camera apparatus of the present invention has a special switch circuit which, when an electronic view finder with a stereo microphone is mounted on a video camera main body in a reverse posture, electrically reverses the top/bottom portions of a picture displayed in the electronic view finder and also exchanges the L and R information of stereophonic signals supplied to a stereo recording apparatus.

According to the present invention, based on the mounting posture of the electronic view finder, the L/R stereophonic signals from a stereo microphone is exchanged with the reversing of the top/bottom portions of a picture in the view finder. Therefore, a proper stereophonic recording can be effected both in the normal and reverse posture photographing.

DETAILED DESCRIPTION OF THE PREFERRED EMBODIMENT

Now, description of an embodiment of the invention will be given with reference to the accompanying drawings. Common reference numerals used among the figures denote the same elements, thereby avoiding redundant explanation.

Figure 3:
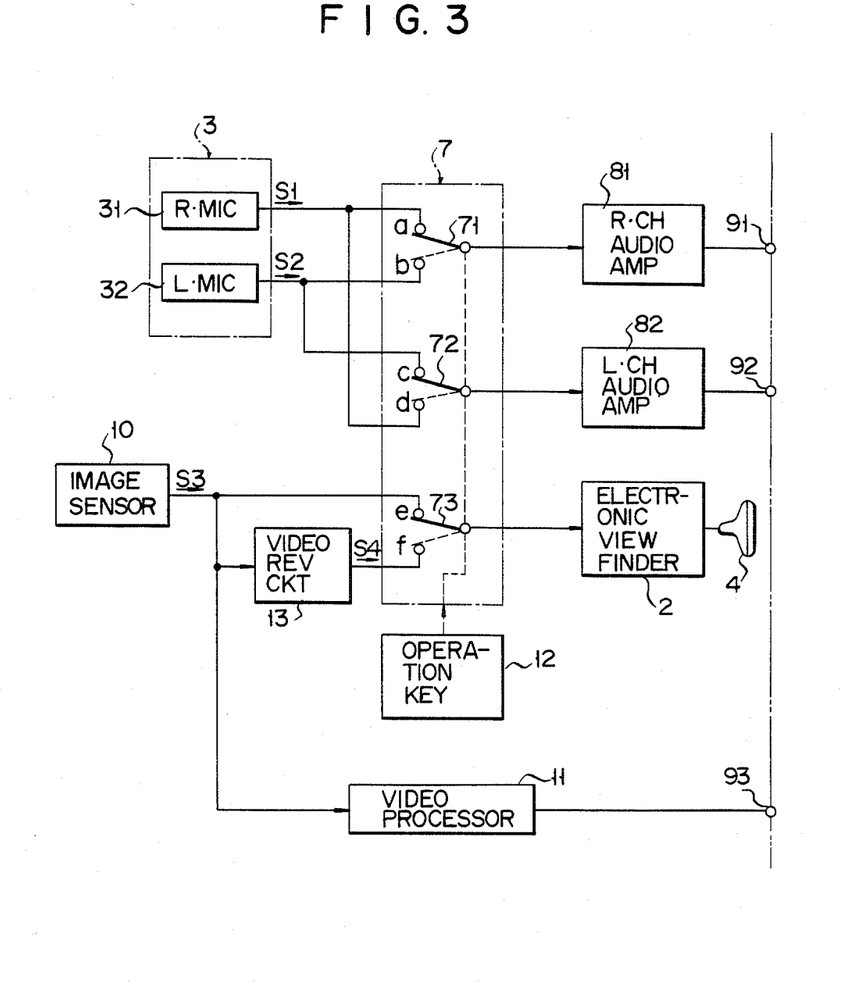
FIG. 3 shows an essential part of the video camera apparatus according to the present invention.

FIG. 3 shows an essential part of the video camera apparatus according to the present invention. Stereo microphone 3 fixed at electronic view finder 2 includes a unidirectional R (right) channel microphone 31 and a unidirectional L (left) channel microphone 32. These microphones 31 and 32 independently and respectively provide electric sound signals S1 and S2. R channel sound signal S1 from microphone 31 is supplied via a closed contact a of a switch 71 to an R channel audio amplifier 81. L channel sound signal S2 from microphone 32 is supplied via a closed contact c of a switch 72 to an L channel audio amplifier 82. Output circuits of amplifiers 81 and 82 are connected to output terminals 91 and 92, respectively. Terminals 91 and 92 are coupled to a stereo recorder (not shown) which is combined in the video camera main body or provided separately. This stereo recorder may be a magnetic disc recorder or magnetic tape recorder. A typical example being suitable for such a stereo recorder is disclosed in:

(1) Japanese Patent Disclosure No. 53-98809 (Aug. 29, 1978), (2) Japanese Patent Disclosure No. 56-21487 (Feb. 27, 1981), (3) Japanese Patent Disclosure No. 57-39676 (Mar. 4, 1982), and (4) Japanese Patent Disclosure No. 57-65987 (Apr. 21, 1982).

All disclosures of the above four Japanese Patent Disclosures are incorporated in the present application. Output signals at terminals 91 and 92, which respectively correspond to R and L channel sound signals S1 and S2, are properly recorded by the above stereo recorder.

Camera lens 5 (FIG. 1) of video camera main body 1 optically catches an object image (not shown). This optical image is converted by an image sensor 10 into a video signal S3. Video signal S3 is supplied via a closed contact e of a switch 73 to an electronic circuit of view finder 2. This view finder circuit 2 supplies a video signal to CRT 4 so that a picture corresponding to the image caught by camera lens 5 is displayed at CRT 4. Video signal S3 is supplied to a video processor 11 and properly signal-processed therein. Video processor 11 may be a conventional one. The processed output from video processor 11 is supplied via a terminal 93 to a video recorder (not shown) and is recorded therein. This video recorder may be a magnetic disc recorder or magnetic tape recorder. The video recorder is combined in the video camera main body or provided separately. A typical example being suitable for such a video recorder is disclosed in said Japanese Patent Disclosures No. 53-98809, No. 57-39676, and No. 57-65987.

Switches 71 to 73 form a 3-gang 2-contact exchange switch circuit 7. The switching operation of switch circuit 7 may be performed by the manipulation of an operation key 12. When view finder 2 is mounted on main body 1 in a normal posture for the right eye photographing (FIG. 2A), each of switches 71 to 73 normally selects the upper contact (a, c, e) as illustrated in FIG. 3. When view finder 2 is mounted on main body 1 in a reverse posture for the left eye photographing (FIG. 2B), each of switches 71 to 73 selects the lower contact (b, d, f) by the manipulation of operation key 12, as illustrated by the broken lines in FIG. 3. Then, sound signal S1 from microphone 31 is supplied via the lower contact d of switch 72 to L channel audio amplifier 82 and sound signal S2 from microphone 32 is supplied via the lower contact b of switch 71 to R channel audio amplifier 81, so that a normal stereophonic recording is effected even in the reverse posture photographing.

Video signal S3 is top/bottom-reversed via a video reversing circuit 13. A top/bottom-reversed video signal S4 from reversing circuit 13 is supplied via the lower contact f of switch 73 to the electronic circuit of view finder 2, so that a top/bottom-reversed video display is performed at CRT 4.

According to the embodiment of the invention, since exchange switch circuit 7 containing R & L exchanging switches 71 and 72 is specially provided, a correct stereophonic recording is effected, with the top/bottom-reversed display, in the reverse posture photographing mode.

Figure 4:
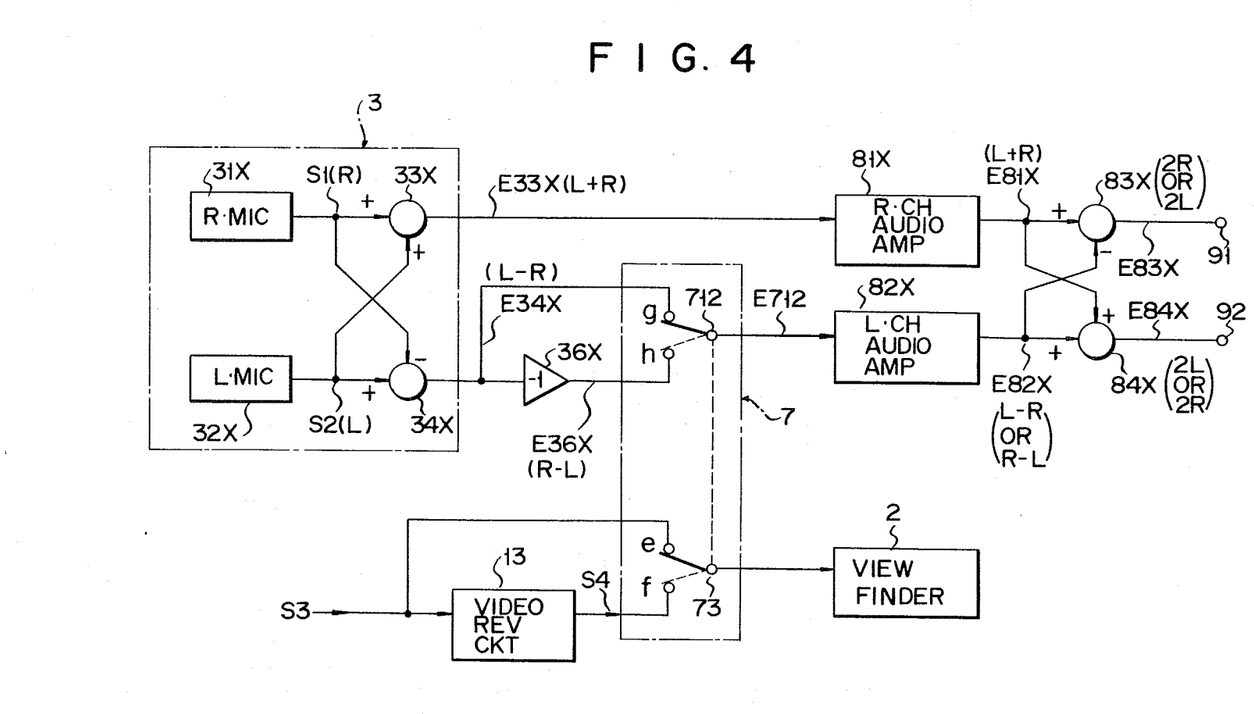
FIG. 4 shows a modification of FIG. 3.

FIG. 4 shows a modification of the embodiment of FIG. 3. In FIG. 4, a matrix type stereo microphone 3 is used. An R channel microphone 31X provides an R channel signal S1 (R) and an L channel microphone 32X provides an L channel signal S2 (L). Signal S2 is added to signal S1 in an adder 33X, and signal S1 is subtracted from signal S2 in a subtracter 34X. Adder 33X supplies a signal E33X corresponding to S1 plus S2 (L+R) to an R channel audio amplifier 81X. Subtracter 34X supplies a signal E34X corresponding to S2 minus S1 (L−R) to a phase-inverting circuit 36X.

An output E36X (R−L) from phase-inverting circuit 36X is supplied to a lower contact h of a switch 712 whose upper contact g receives signal E34X (L−R). Signal E34X or E36X selected by switch 712 is supplied as a signal E712 to an L channel audio amplifier 82X. Switch 712 is ganged with the switch 73 so that, when switch 73 selects the upper contact e, switch 712 selects the upper contact g. Switch 712 corresponds to the switches 71 and 72 of FIG. 3.

An output E82X (L−R or R−L) of amplifier 82X is subtracted in a subtracter 83X from an output E81X (L+R) of amplifier 81X. Output E81X is added to output E82X in an adder 84X. When switch 712 selects the upper contact g, subtracter 83X provides a signal E83X corresponding to 2R and adder 84X provides a signal E84X corresponding to 2L. When switch 712 selects the lower contact h, subtracter 83X provides a signal E83X corresponding to 2L and adder 84X provides a signal E84X corresponding to 2R. Signals E83X and E84X are supplied to a stereo recorder (not shown) via output terminals 91 and 92, respectively.

According to the configuration of FIG. 4, when the amplitude and/or the phase of signal E82X is properly changed, various stereo effects can be obtained. Further, no switch element is used for the L+R information (E33X). From this, even if a faulty contact occurs in switch 712, though no stereophonic recording is performed, a monaural recording for L+R is performed, thereby avoiding a complete recording miss due to the faulty contact.

Figure 5:
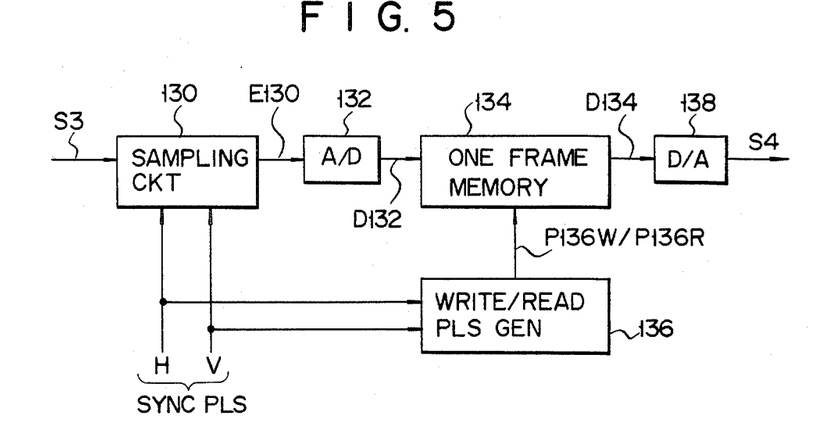
FIG. 5 shows a configuration of video reversing circuit 13 in FIG. 3.

FIG. 5 shows an example of video reversing circuit 13 in FIG. 3. Video signal S3 from image sensor 10 is supplied to a sampling circuit 130. Circuit 130 samples the amplitude of video signal S3 in synchronism with horizontal and vertical sync signals. A sampled video signal E130 from circuit 130 is converted into digital video data D132 via an A/D converter 132. Data D132 is sequentially written in the first to N-th addresses of an one frame memory 134 according to a write pulse P136W. Write pulse P136W is generated from a write/read pulse generator 136. Memory 134 may be a high-speed RAM or high-speed CCD register. Immediately after the completion of writing of data D132 for one frame, the written data is sequentially read out from N-th to first addresses of memory 134 according to a read pulse P136R from write/read pulse generator 136. Thus, the reading order is reversed from the writing order. Pulses P136W and P135R are generated in synchronism with the horizontal and vertical sync signals. Read-out data D134 from memory 134 is converted via a D/A converter 138 into top/bottom-reversed analog video signal S4.

Figure 6A:
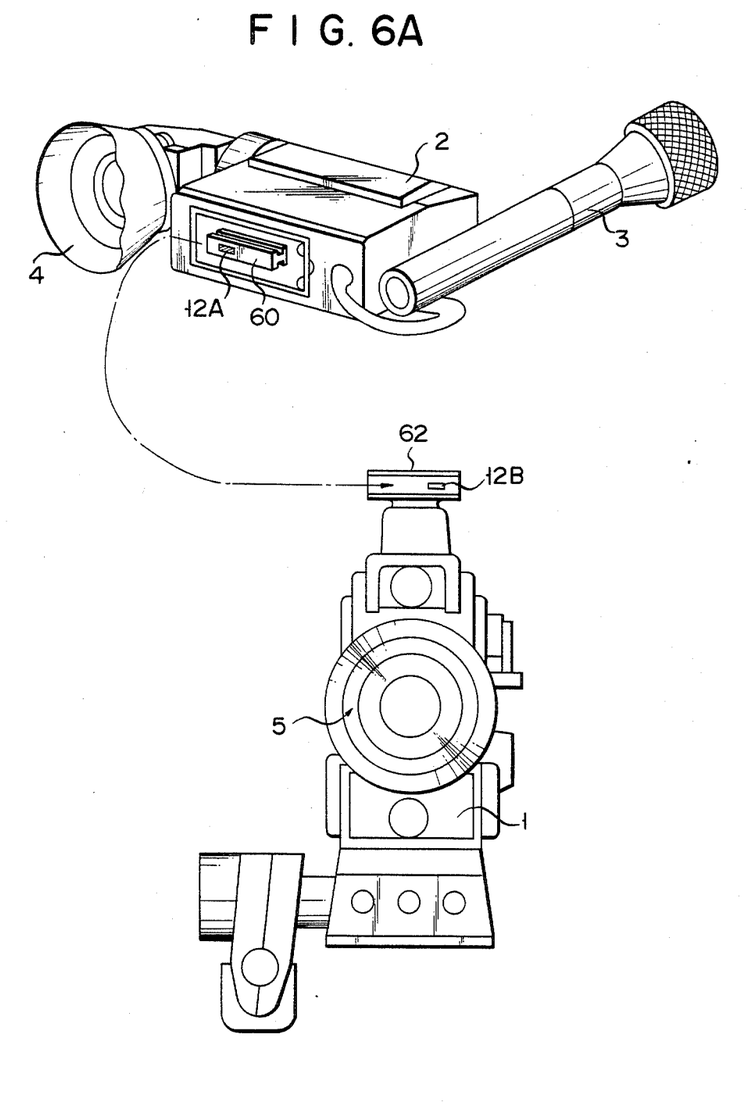
FIGS. 6A to 6D jointly show a mechanical configuration for operation key 12 wherein the switching operation of exchange switch circuit 7 is ganged with the mounting of electronic view finder 2.

FIG. 6A illustrates a mechanical configuration in which the switching of switch circuit 7 is ganged via key 12 with the mounting of electronic view finder 2. The rear side of electronic view finder 2 is provided with a mounting member 60. A nob 12A of operation key 12 is projected at a given location of mounting member 60. The top end portion of video camera main body 1 is provided with a holding member 62. A dent 12B is formed at a given location of holding member 62. The locations of nob 12A and dent 12B are similarly deviated from the geometrical centers of members 60 and 62. The mechanical relation between the action of nob 12A and that of switches 71 to 73 (FIG. 3) is such that these switches select the contacts a, c and e when nob 12A is not depressed while they select the contacts b, d and f when nob 12A is depressed.

Figure 6B:
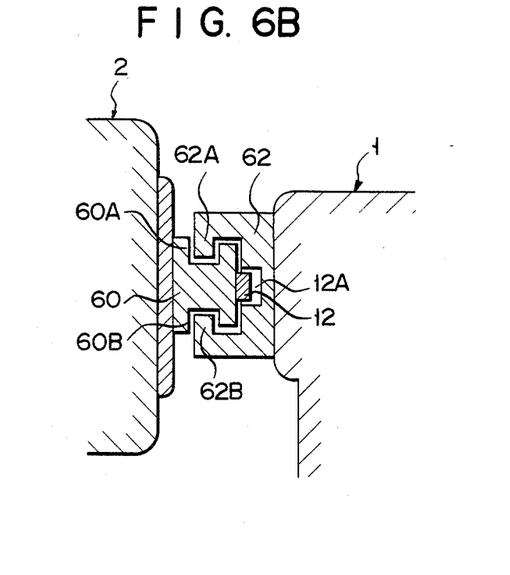
Figure 6C:
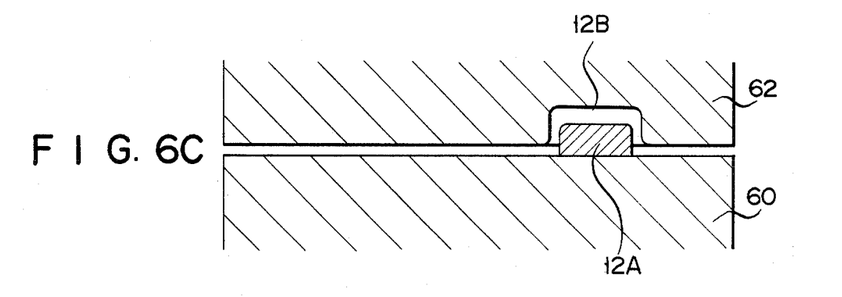
Figure 6D:
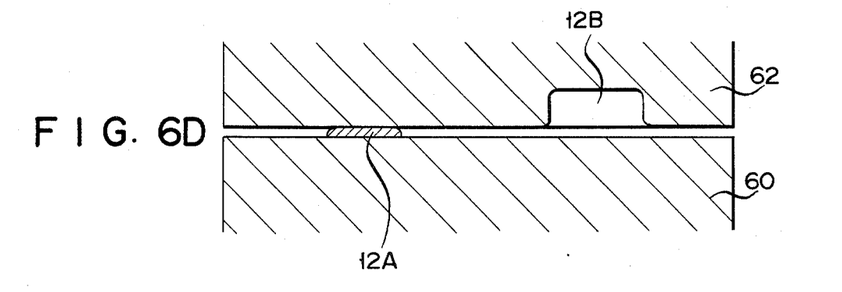

FIG. 6B illustrate a fittig state between mounting member 60 and holding member 62. Mounting member 60 has a pair of opposing grooves 60A and 60B, and holding member 62 has a pair of hooks 62A and 62B. When view finder 2 is mounted on main body 1, the hooks 62A and 62B of holding member 62 get into the corresponding grooves 60A and 60B of mounting member 60. When view finder 2 is mounted in the normal posture as shown in FIG. 2A, nob 12A falls into the space of dent 12B (FIG. 6C) so that switches 71 to 73 in FIG. 3 select the contacts a, c and e. When view finder 2 is mounted in the reverse posture as shown in FIG. 2B, nob 12A is depressed by the opposing wall of holding member 62 (FIG. 6D) so that switches 71 to 73 in FIG. 3 select the contacts b, d and f.

According to the configuration of FIGS. 6A to 6D, no manual manipulation of operation key 12 is required.

Figure 7A:
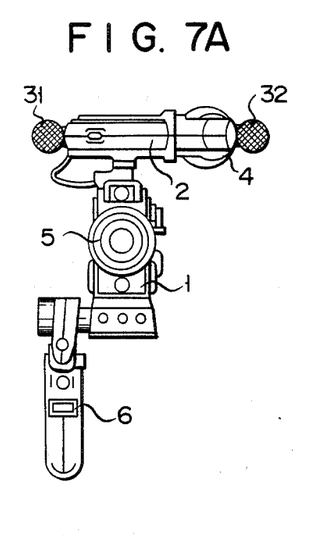
FIGS. 7A and 7B are modifications of FIGS. 2A and 2B, wherein two separate microphones are used in place of a one-point stereo microphone.
Figure 7B:
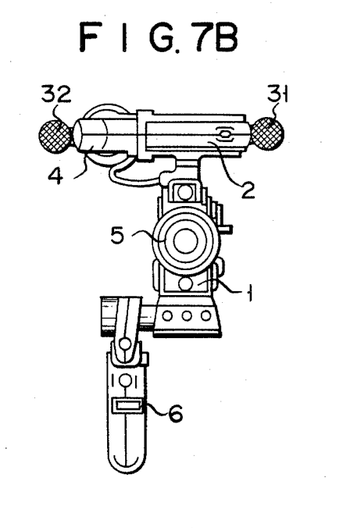

FIGS. 7A and 7B are modifications of FIGS. 2A and 2B. In FIGS. 7A and 7B, two separate microphones 31 and 32 are used in place of a one-point stereo microphone 3 of FIGS. 2A and 2B.

Figure 8:
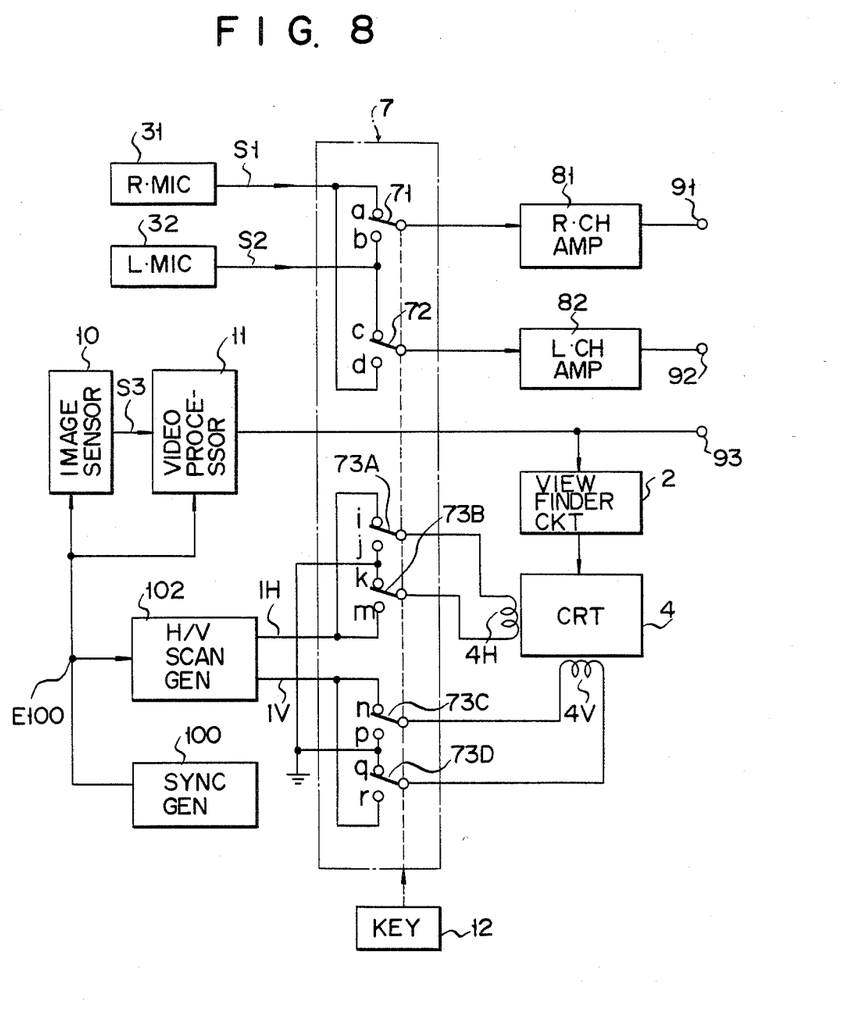
FIG. 8 shows another modification of FIG. 3.

FIG. 8 shows another modification of the embodiment of FIG. 3. In FIG. 8, no video reversing circuit is used. Instead of use of a video reversing circuit, the polarity of each of horizontal and vertical scanning drive currents for an electromagnetic deflection type CRT 4 is inverted. Then, the top/bottom portions of a picture displayed in electronic view finder 2 are electrically reversed in the reverse posture mounting. More specifically, a sync pulse generator 100 supplies a horizontal/vertical sync signal E100 to a horizontal/vertical (H/V) scanning signal generator 102. Generator 102 generates a horizontal drive current IH and a vertical drive current IV. In the normal posture mounting, current IH flows to the circuit ground via a contact i of a switch 73A, a horizontal deflection coil 4H and a contact k of a switch 73B. Current IV flows to the circuit ground via a contact n of a switch 73C, a vertical deflection coil 4V and a contact q of a switch 73D.

On the other hand, in the reverse posture mounting, current IH flows via a contact m of switch 73B, horizontal deflection coil 4H and a contact j of switch 73A to the circuit ground. Current IV flows via a contact r of switch 73D, vertical deflection coil 4V and a contact p of switch 73C to the circuit ground. Switches 73A to 73D are ganged with switches 71 and 72. In the reverse posture mode, the current direction flowing through deflection coil 4H and that through deflection coil 4V are inverted from those in the case of normal posture mode. Accordingly, the top/bottom portions of a picture displayed in electronic view finder 2 are electrically reversed in the reverse posture mounting.

The present invention is not limited to the above embodiment. Various changes or modifications may be made within the scope of the invention claimed. For instance, CRT 4 in FIG. 8 may be an electrostatic deflection type CRT or an LCD display panel.

What is claimed is:

1. A video camera apparatus comprising:
   a video camera main body for providing a video signal corresponding to an optical image to be photographed;
   an electronic view finder detachably mounted on said video camera main body in a normal or reverse posture, for displaying a picture corresponding to said video signal;
   microphone means fixed to said electronic view finder, for providing stereophonic signals to be supplied to a stereo recording apparatus which is adapted to the video camera apparatus, said stereophonic signals containing left and right information regarding a stereophonic effect; and
   switch means coupled to said video camera main body, said electronic view finder and said microphone means, for electrically reversing top/bottom portions of the picture displayed in said electronic view finder and exchanging the left and right information of said stereophonic signals when said electronic view finder is mounted on said video camera main body in said reverse posture.

2. A video camera apparatus according to claim 1, wherein said video signal contains top/bottom-reversed and top/bottom-nonreversed video signals each corresponding to said optical image, and one of said top/bottom-reversed and top/bottom-nonreversed video signals is supplied to said electronic view finder.

3. A video camera apparatus according to claim 2, wherein said switch means exchanges the supply for said top/bottom-reversed and top/bottom-nonreversed video signals and also exchanging the supply for left and right information of said stereophonic signals.

4. A video camera apparatus according to claim 3, wherein the exhanging function of said switch means depends on whether said electronic view finder is mounted in the normal or reverse posture.

5. A video camera apparatus according to claim 1, wherein said electronic view finder includes electric display menas for displaying the picture of said optical image according to said video signal, said electric display means is provided with:
   horizontal means for electrically scanning said electric display menas in a horizontal direction of the displayed picture according to a horizontal drive signal; and
   vertical means for electrically scanning said electric display menas in a vertical direction of the displayed picture according to a vertical drive signal,
   and wherein said switch means includes:
   phase-inverting means coupled to said horizontal and vertical means, for inverting the phase of each of said horizontal and vertical drive signals so that the scanning direction in the horizontal direction and that in the vertical direction are reversed, thereby achieving the top/bottom reversing of the picture in said electronic view finder.

6. A video camera apparatus according to claim 5, wherein said electric display menas is formed of a CRT, said horizontal means is formed of a horizontal drive coil through which a horizontal current corresponding to said horizontal drive signal flows, and said vertical means is formed of a vertical drive coil through which a vertical current corresponding to said vertical drive signal flows,
   and wherein said phase-inverting means changes current flow directions of said horizontal and vertical currents.

7. A video camera apparatus according to claim 6, wherein said switch means exchanges the supply for left and right information of said stereophonic signals when said phase-inverting means changes current flow directions of said horizontal and vertical currents.

8. A video camera apparatus according to claim 7, wherein the exchanging function of said swithch means depends on whether said electronic view finder is mounted in the normal or reverse posture.

9. A video camera apparatus according to claim 1, wherein said microphone means includes a unidirectional R microphone for said right information and a unidirectional L microphone for said left information, said R and L microphone forming a one-point stereo microphone which is fixed at one side of said electronic view finder.

10. A video camera apparatus according to claim 1, wherein said microphone means includes a unidirectional R microphone for said right information and a unidirectional L microphone for said left information, said R microphone being fixed at one side of said electronic view finder and said L microphone being fixed at another side of said electronic view finder.

11. A video camera apparatus according to claim 1, wherein said microphone means includes a unidirectional R microphone for said right information and a unidirectional L microphone for said left information, and wherein said switch means includes:
   a first switch having a contact a which receives the right stereophonic signal from said R microphone and a contact b which receives the left stereophonic signal from said L microphone, for selecting either one of said right and left stereophonic signals and providing the selected Signal to a right channel input of said stereo recording apparatus; and
   a second switch having a contact c which receives said left stereophonic signal and a contact d which receives said right stereophonic signal, for selecting the other one of said right and left stereophonic signals and providing the selected signal to a left channel input of said stereo recording apparatus.

12. A video camera apparatus according to claim 11, wherein said switch means further includes:
   a third switch having a contact e which receives said top/bottom-nonreversed video signal and a contact f which receives said top/bottom-reversed video signal, for selecting either one of said top/bottom-reversed and top/bottom-nonreversed video signals and providing the selected video signal to a video input of said electronic view finder; said first to third switches being ganged with each other so that, when said electronic view finder is mounted in the normal posture and said third switch selects the contact e, said first and second switches select the contacts a and c, respectively, and when said electronic view finder is mounted in the reverse posture and said third switch selects the contact f, said first and second switches select the contacts b and d, respectively.

13. A video camera apparatus according to claim 1, wherein said microphone means includes:
   a unidirectional R microphone for providing the right stereophonic signal;
   a unidirectional L microphone for providing the left stereophonic signal;
   encoding matrix means coupled to said R and L microphones, for generating a sum signal corresponding to the sum of said right and left stereophonic signals and generating a difference signal ccrresponding to the difference between said right and left stereophonic signals, said sum signal being supplied to one of stereo inputs of said stereo recording apparatus; and
   inverter means coupled to said encoding matrix means, for phase-inverting said difference signal to provide an inverted difference signal,
   and wherein said switch means includes:
   a sound signal exchange switch having a contact g which receives said difference signal from said encoding matrix means and a contact h which receives said inverted difference signal from said inverter means, for selecting either one of said difference and inverted difference signals and providing the selected signal as a selected difference signal to the other of stereo inputs of said stereo recording apparatus.

14. A video camera apparatus according to claim 13, further comprising:
   decoding matrix means coupled to said encoding matrix means and said sound signal exchange switch, for generating a decoded sum signal corresponding to the sum of said selected difference signal and said sum signal and generating a decoded difference signal corresponding to the difference between said selected difference signal and said sum signal, said decoded difference signal being supplied to one of stereo inputs of said stereo recording apparatus, and said decoded sum signal being supplied to the other of stereo inputs of said stereo recording apparatus.

15. A video camera apparatus according to claim 13, wherein said switch means further includes:
   a video signal exchange switch having a contact e which receives said top/bottom-nonreversed video signal and a contact f which receives said top/bottom-reversed video signal, for selecting either one of said top/bottom-reversed and top/bottom-nonreversed video signals and providing the selected video signal to a video input of said electronic view finder; said sound and video signal exchange switches being ganged with each other so that, when said electronic view finder is mounted in the normal posture and said video signal exchange switch selects the contact e, said sound signal exchange switch selects the contact g, and when said electronic view finder is mounted in the reverse posture and said video signal exchange switch selects the contact f, said sound signal exchange switch selects the contact h.

16. A video camera apparatus comprising:
   a video camera main body for providing top/bottom-reversed and top/bottom-nonreversed video signals corresponding to an optical image, said top/bottom-reversed or top/bottom-nonreversed video signal being supplied to a video recording apparatus which is adapted to the video camera apparatus;
   an electronic view finder responsive to said top/bottom-reversed or top/bottom-nonreversed video signal and being detachably mounted on said video camera main body in a normal or reverse posture, the normal posture being substantially symmetrical to the reverse posture with respect to the mounted position of said electronic view finder on said video camera main body;
   microphone means fixed to said electronic view finder, for providing stereophonic signals supplied to a stereo recording apparatus which is adapted to the video camera apparatus, said stereophonic signals containing directional information regarding a stereophonic effect; and
   switch means coupled to said video camera main body and to said microphone means, for exchanging the selection for said top/bottom-reversed and top/bottom-nonreversed video signals and also exchanging signal transmission for left and right channels of said stereophonic signals; the exchanged one of said top/bottom-reversed and top/- bottom-nonreversed video signals being supplied to said electronic view finder, and the exchanging function of said switch means depending on whether said electronic view finder is mounted in the normal or reverse posture.

17. A video camera apparatus according to claim 16, wherein said microphone means includes a unidirectional R microphone for said right channel and a unidirectional L microphone for said left channel, said R and L microphone forming a one-point stereo microphone which is fixed at one side of said electronic view finder.

18. A video camera apparatus according to claim 16, wherein said microphone means includes a unidirectional R microphone for said right channel and a unidirectional L microphone for said left channel, said R microphone being fixed at one side of said electronic view finder and said L microphone being fixed at another side of said electronic view finder.

19. A video camera apparatus according to claim 16, wherein said microphone means includes a unidirectional R microphone for said right channel and a unidirectional L microphone for said left channel, and wherein said switch means includes:

a first switch having a contact a which receives the right channel stereophonic signal from said R microphone and a contact b which receives the left channel stereophonic signal from said L microphone, for selecting either one of said right and left channel stereophonic signals and providing the selected signal to a right channel input of said stereo recording apparatus;

a second switch having a contact c which receives said left channel stereophonic signal and a contact d which receives said right channel stereophonic signal, for selecting the other one of said right and left channel stereophonic signals and providing the selected signal to a left channel input of said stereo recording apparatus; and a third switch having a contact e which receives said top/bottom-nonreversed video signal and a contact f which receives said top/bottom-reversed video signal, for selecting either one of said top/bottom-reversed and top/bottom-nonreversed video signals and providing the selected video signal to a video input of said electronic view finder; said first to third switches being ganged with each other so that, when said electronic view finder is mounted in the normal posture and said third switch selects the contact e, said first and second switches select the contacts a and c, respectively, and when said electronic view finder is mounted in the reverse posture and said third switch selects the contact f, said first and second switches select the contacts b and d, respectively.

20. A video camera apparatus according to claim 16, wherein said microphone means includes:

a unidirectional R microphone for providing the right channel stereophonic signal;

a unidirectional L microphone for providing the left channel stereophonic signal;

encoding matrix means coupled to said R and L microphones, for generating a sum signal corresponding to the sum of said right and left channel stereophonic signals and generating a difference signal corresponding to the difference between said right and left channel stereophonic signals, said sum signal being supplied to one of stereo inputs of said stereo recording apparatus; and inverter means coupled to said encoding matrix means, for phase-inverting said difference signal to provide an inverted difference signal, and wherein said switch means includes:

a sound signal exchange switch having a contact g which receives said difference signal from said encoding matrix means and a contact h which receives said inverted difference signal from said inverter means, for selecting either one of said difference and inverted difference signals and providing the selected signal as a selected difference signal to the other of stereo inputs of said stereo recording apparatus; and a video signal exchange switch having a contact e which receives said top/bottom-nonreversed video signal and a contact f which receives said top/bottom-reversed video signal, for selecting either one of said top/bottom-reversed and top/bottom-nonreversed video signals and providing the selected video signal to a video input of said electronic view finder; said sound and video signal exchange switches being ganged with each other so that, when said electronic view finder is mounted in the normal posture and said video signal exchange switch selects the contact e, said sound signal exchange switch selects the contact g, and when said electronic view finder is mounted in the reverse posture and said video signal exchange switch selects the contact f, said sound signal exchange switch selects the contact h.

21. A video camera apparatus according to claim 20, further comprising:

decoding matrix means coupled to said encoding matrix means and said sound signal exchange switch, for generating a decoded sum signal corresponding to the sum of said selected difference signal and said sum signal and generating a decoded difference signal corresponding to the difference between said selected difference signal and said sum signal, said decoded difference signal being supplied to one of stereo inputs of said stereo recording apparatus, and said decoded sum signal being supplied to the other of stereo inputs of said stereo recording apparatus.

* * * * *